US012657684B2

(12) United States Patent (10) Patent No.: US 12,657,684 B2
Matsunaga et al. (45) Date of Patent: Jun. 16, 2026

(54) APPARATUS AND METHOD FOR MEASURING GRANULAR OBJECTS, ABNORMALITY DETECTION METHOD, AND METHOD FOR PRODUCING GRANULAR IRON

(71) Applicant: JFE STEEL CORPORATION, Tokyo (JP)

(72) Inventors: Arihiro Matsunaga, Tokyo (JP); Shunsuke Mori, Tokyo (JP); Kazuhiro Tsuchida, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 247 days.

(21) Appl. No.: 18/712,546

(22) PCT Filed: Nov. 18, 2022

(86) PCT No.: PCT/JP2022/042924
§ 371 (c)(1),
(2) Date: May 22, 2024

(87) PCT Pub. No.: WO2023/100696
PCT Pub. Date: Jun. 8, 2023

(65) Prior Publication Data
US 2025/0022115 A1 Jan. 16, 2025

(30) Foreign Application Priority Data
Nov. 30, 2021 (JP) ................................. 2021-194425

(51) Int. Cl.
*G06K 9/00* (2022.01)
*B22F 9/06* (2006.01)
(Continued)

(52) U.S. Cl.
CPC .............. *G06T 7/0004* (2013.01); *B22F 9/06* (2013.01); *G01N 15/0205* (2013.01); *G06T 7/62* (2017.01);
(Continued)

(58) Field of Classification Search
None
See application file for complete search history.

(56) References Cited

U.S. PATENT DOCUMENTS

2020/0306831 A1* 10/2020 Mori ......................... H01F 1/36
2024/0102907 A1 3/2024 Tatewaki et al.

FOREIGN PATENT DOCUMENTS

JP 4639840 B2 * 2/2011
JP 2017072497 A 4/2017
(Continued)

OTHER PUBLICATIONS

International Search Report (PCT/ISA/210) with translation and Written Opinion (PCT/ISA/237) mailed on Jan. 10, 2023, by the Japanese Patent Office as the International Searching Authority for International Application No. PCT/JP2022/042924. (8 pages).
(Continued)

*Primary Examiner* — Wei Wen Yang
(74) *Attorney, Agent, or Firm* — Buchanan Ingersoll & Rooney PC

(57) ABSTRACT

An apparatus and a method for measuring granular objects, an abnormality detection method, and a method for producing granular iron are provided. An apparatus for measuring granular objects thrown into a liquid surface, the apparatus including an imaging device configured to continuously image the liquid surface, and a processing unit configured to measure the granular objects from time-series image data of the liquid surface imaged by the imaging device, in which the processing unit is configured to perform dynamic mode
(Continued)

decomposition from the imaging device and the time-series image data, select, as a measurement dynamic mode, a dynamic mode in which an emphasized point is a vibrating liquid surface among dynamic modes obtained by the dynamic mode decomposition, obtain a measurement vibration frequency as a vibration frequency of a dynamic mode eigenvalue in the measurement dynamic mode, and measure the granular objects based on the measurement vibration frequency.

20 Claims, 4 Drawing Sheets

(51) Int. Cl.
    *G01N 15/0205*     (2024.01)
    *G06T 7/00*     (2017.01)
    *G06T 7/62*     (2017.01)

(52) U.S. Cl.
    CPC ....... *B22F 2301/35* (2013.01); *B22F 2998/10* (2013.01); *G06T 2207/10016* (2013.01); *G06T 2207/30136* (2013.01); *G06T 2207/30242* (2013.01)

(56) References Cited

FOREIGN PATENT DOCUMENTS

| JP | 2021103146 A | 7/2021 |
| JP | 2021127510 A | 9/2021 |
| WO | 2021075309 A1 | 4/2021 |

OTHER PUBLICATIONS

Schmid, P.J., "Dynamic mode decomposition of numerical and experimental data", Journal of Fluid Mechanics, Aug. 2010, vol. 656, pp. 5-28, doi:10.1017/s0022112010001217. (25 pages).

Tu, J.H., et al., "On Dynamic Mode Decomposition: Theory and Applications", Journal of Computational Dynamics, Dec. 2014, vol. 1, No. 2, pp. 391-421, doi:10.3934/jcd.2014.1.391. (31 pages).

Notification of Transmittal of Translation of the International Preliminary Report on Patentability and an English translation of the Written Opinion issued May 2, 2024, in corresponding International Application No. PCT/JP2022/042924. (5 pages).

* cited by examiner

1

APPARATUS AND METHOD FOR MEASURING GRANULAR OBJECTS, ABNORMALITY DETECTION METHOD, AND METHOD FOR PRODUCING GRANULAR IRON

CROSS REFERENCE TO RELATED APPLICATIONS

This is the U.S. National Phase application of PCT/JP2022/042924, filed Nov. 18, 2022, which claims priority to Japanese Patent Application No. 2021-194425 filed Nov. 30, 2021, the disclosures of these applications being incorporated herein by reference in their entireties for all purposes.

FIELD OF THE INVENTION

The present invention relates to an apparatus and a method for measuring granular objects, an abnormality detection method, and a method for producing granular iron.

BACKGROUND OF THE INVENTION

As a process for producing granular iron, a method for producing granular molten iron from molten iron and for solidifying the granular molten iron with water is known. In such a process, for example, molten iron flowing out at several hundred tons per hour is applied to a collision structure, which is a solid wall surface, and the molten iron is torn off from each other by the kinetic energy of the molten iron to produce granular molten iron. In addition, the molten iron that has collided with the collision structure becomes granular molten iron, spreads in a circle having a diameter of several meters, falls into a water tank provided below, and is cooled, thereby producing granular iron.

In such a producing method, since the molten iron is processed at several hundred tons per hour, there is a large number of granular molten iron, and the molten iron is at a high temperature of 1300° C. to 1600° C. Therefore, in a case where a size of the granular molten iron is large, the granular molten iron cannot be completely solidified in water, the molten iron is deposited in water, and there is a probability that a steam explosion may occur. Therefore, in a producing process of granular iron, it is necessary to control the size of the granular molten iron to be equal to or less than a certain size, and further, in order to control the size of the granular molten iron, it is necessary to measure the number and size of the granular molten iron to be produced.

As a method for measuring granular liquid, for example, PTL 1 discloses a method for measuring a flow rate using an image. In the measurement method of PTL 1, the target liquid droplet is irradiated with light from a point light source, the shadow of the target liquid droplet is imaged with an image sensor provided on the opposite side of the point light source with respect to the target liquid droplet, and the contour of the shadow is recognized, whereby the speed and the flow rate of the liquid droplet can be measured.

PATENT LITERATURE

PTL 1: JP 2017-72497 A

SUMMARY OF THE INVENTION

However, in the measurement method of PTL 1, it is necessary to apply light and image the liquid droplet. The process for producing granular iron requires the process of refining at several hundred tons per hour, and a large number of granular molten iron of 5,000 or more are present in one second. Therefore, it is not practical to apply the measurement method of PTL 1 to the process for producing granular iron and to apply light to each granular molten iron to image the shadow. In addition, the granular molten iron spreads in a wide range to form a circle of several meters in the plane direction and is landed, and thus it is difficult to apply light to each granular molten iron and image the liquid droplets in a state of floating in the air. Therefore, in the measurement method of PTL 1, it may be difficult to measure the number and the size (grain diameter) of the granular objects.

Aspects of the present invention have been made in view of the above problems, and an object according to aspects of the present invention is to provide an apparatus and a method for measuring granular objects, an abnormality detection method, and a method for producing granular iron, which are capable of measuring the number and the grain diameter of the granular objects in processing in which a large number of granular objects fall to a liquid surface and the liquid surface is vibrated, such as a producing process of granular iron.

(1) According to one aspect of the present invention, there is provided an apparatus for measuring granular objects that measures granular objects thrown into a liquid surface of a first liquid, the apparatus including an imaging device configured to continuously image the liquid surface, and a processing unit configured to measure the granular objects from time-series image data of the liquid surface imaged by the imaging device, in which the processing unit is configured to perform dynamic mode decomposition on the time-series image data, select, as a measurement dynamic mode, a dynamic mode in which an emphasized point is a vibrating liquid surface among dynamic modes obtained by the dynamic mode decomposition, obtain a measurement vibration frequency as a vibration frequency of a dynamic mode eigenvalue in the measurement dynamic mode, and measure the granular objects based on the measurement vibration frequency.

(2) In the configuration of (1), the processing unit may select, in a case where there are a plurality of the measurement dynamic modes, a measurement dynamic mode in which an absolute value of the vibration frequency of the dynamic mode eigenvalue is 0.0001 Hz or more and the absolute value of the vibration frequency is small.

(3) In the configuration (1) or (2), the processing unit may measure the number of the granular objects based on the measurement vibration frequency.

(4) In the configuration of (1) or (2), the processing unit may measure a grain diameter of the granular object based on the measurement vibration frequency.

(5) In the configuration of (4), the processing unit may measure the grain diameter using Formula (16),

[Math. 1]

$$D = \left( \frac{6G}{\pi f \rho} \right)^{\frac{1}{3}}$$

Formula (16)

D: representative grain diameter [m],
G: mass flow rate of granular object [kg/s],
f: measurement vibration frequency [Hz], and
ρ: density of granular object [kg/m³].

(6) In the configuration of (4), the processing unit may measure the grain diameter using Formula (18),

[Math. 2]

$$D = C\left(\frac{G}{f}\right)^k \qquad \text{Formula (18)}$$

D: representative grain diameter [m],
C: correction coefficient,
G: mass flow rate of granular object [kg/s],
f: measurement vibration frequency [Hz], and
k: correction exponent.

(7) In the configuration of any one of (1) to (6), the granular object may be generated by colliding a second liquid with a collision structure.

(8) In the configuration of (7), the first liquid may be water containing $H_2O$ as a main component, and the second liquid may be molten iron containing Fe as a main component.

(9) According to another aspect of the present invention, there is provided a method for measuring granular objects that measures granular objects thrown into a liquid surface of a first liquid, the method including: an imaging step of continuously imaging the liquid surface, and a measuring step of measuring the granular objects from time-series image data of the liquid surface obtained by imaging, in which the measuring step includes, performing dynamic mode decomposition on the time-series image data, selecting, as a measurement dynamic mode, a dynamic mode in which an emphasized point is a vibrating liquid surface among dynamic modes obtained by the dynamic mode decomposition, obtaining a measurement vibration frequency as a vibration frequency of a dynamic mode eigenvalue in the measurement dynamic mode, and measuring the granular objects based on the measurement vibration frequency.

(10) In the configuration of (9), the measuring step may include, measuring a grain diameter of the granular object based on the measurement vibration frequency.

(11) According to still another aspect of the present invention, there is provided an abnormality detection method for detecting an abnormality in granular objects thrown into a liquid surface of a first liquid, the method including determining whether or not the grain diameter is equal to or more than a threshold value after measuring a grain diameter of the granular object by using the method for measuring granular objects according to the configuration of (10), and detecting that the abnormality has occurred in a case where the grain diameter is equal to or more than the threshold value.

(12) According to still another aspect of the present invention, there is provided a method for producing granular iron, including generating granular objects which are granular molten iron by colliding a second liquid, which is molten iron containing Fe as a main component, with a collision structure, and producing granular iron by throwing the generated granular objects into a first liquid, which is water containing $H_2O$ as a main component, in which, when the granular objects are thrown into the first liquid, the granular objects thrown into a liquid surface of the first liquid are measured by using the method for measuring granular objects according to (9) or (10).

According to one aspect of the present invention, there is provided an apparatus and a method for measuring granular objects, an abnormality detection method, and a method for producing granular iron, which are capable of measuring the number and the grain diameter of the granular objects in processing in which a large number of granular objects fall to a liquid surface and the liquid surface is vibrated.

DETAILED DESCRIPTION OF EMBODIMENTS OF THE INVENTION

Figure 1:
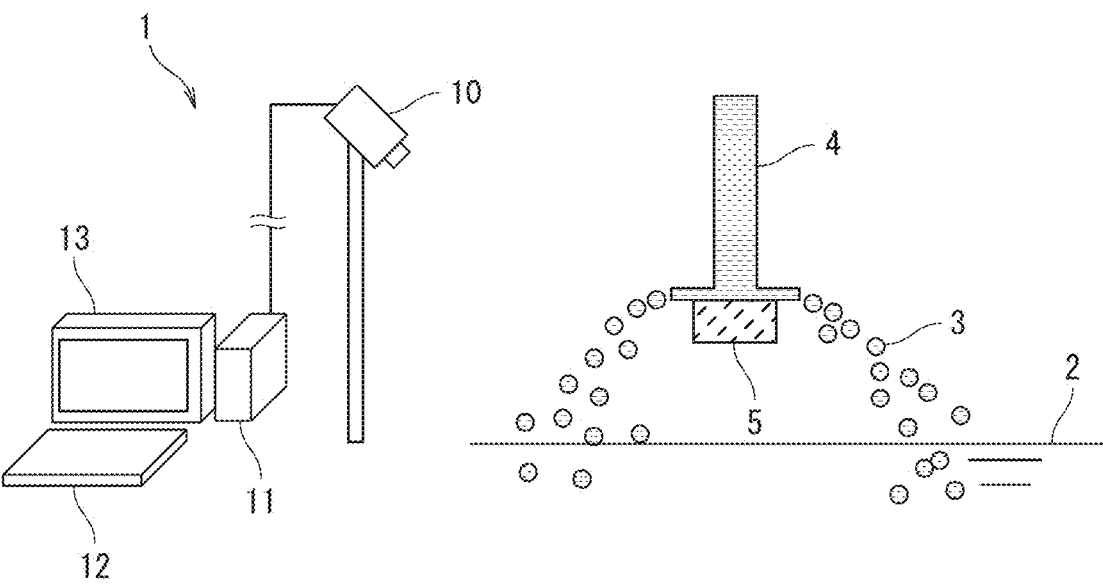
FIG. 1 is a schematic view illustrating an apparatus for measuring granular objects and a method for producing granular iron according to one embodiment of the present invention.

In the following detailed description, an embodiment of the present invention will be described with reference to the drawings. In the description of the drawings, the same or similar parts will be given the same or similar reference numerals and redundant descriptions will be omitted. Each drawing is schematic and may differ from the actual one. In addition, the embodiments described below exemplify apparatuses and methods for embodying the technical idea according to aspects of the present invention, and the technical idea according to aspects of the present invention does not specify the material, structure, arrangement, and the like of the configuration components in the following embodiments. The technical idea according to aspects of the present invention may be modified in various manners within the technical scope specified by the claims described in the claims.

<Apparatus for Measuring Granular Objects>

In processing in which granular objects are thrown into a first liquid stored in a container or the like, the apparatus for measuring granular objects according to the embodiment of the present invention measures (estimates) a grain diameter (diameter) of the granular objects to be thrown. As illustrated in FIG. 1, the apparatus 1 for measuring granular objects measures a grain diameter of a granular object 3 that is thrown into a first liquid 2. In the present embodiment, as an example, the first liquid 2 is water containing $H_2O$ as a main component, and the granular object 3 is granular molten iron. In addition, the granular object 3 that is the granular molten iron is generated when a second liquid 4 that is the molten iron containing Fe as a main component, which is thrown from above, collides with a collision structure 5 made of a refractory material or the like provided above the first liquid 2. In such processing, molten iron is caused to collide with the collision structure 5 at a predetermined throwing speed. The molten iron colliding with the collision structure 5 is pulled and torn by a shear force between the momentum and the air to be granulated, and becomes a large number of granular molten iron (granular objects 3). In addition, the molten iron that has collided with the collision structure 5 spreads in a circular shape when viewed from above and is granulated. The generated granular molten iron is solidified by being thrown into the first liquid 2 and cooled to become granular iron.

Figure 2:
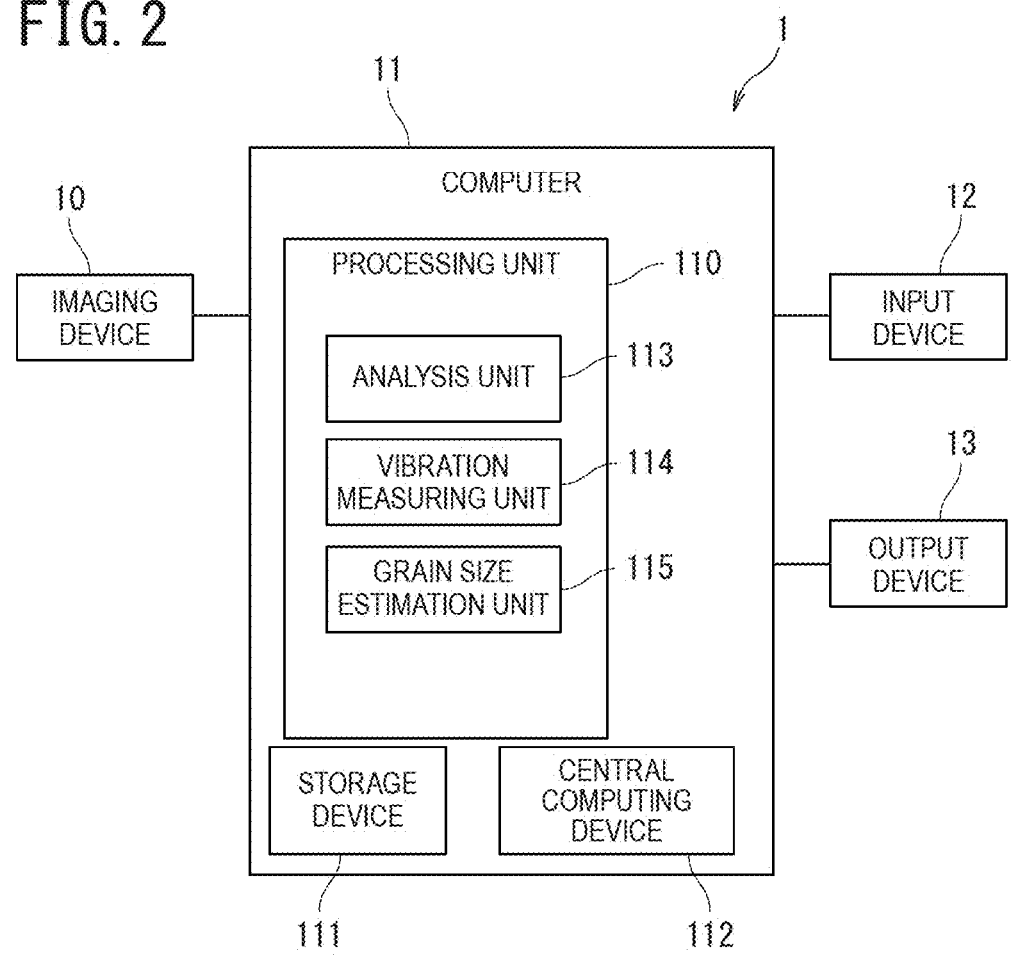
FIG. 2 is a configuration view illustrating the apparatus for measuring granular objects according to one embodiment of the present invention.

As illustrated in FIGS. 1 and 2, the apparatus 1 for measuring includes an imaging device 10, a computer 11, an input device 12, and an output device 13.

The imaging device 10 is a device provided above the first liquid 2 and continuously images surface information of at least the liquid surface of the first liquid 2. The type of the imaging device 10 is not limited as long as the imaging device 10 is a device that can acquire two-dimensional lattice-like time-series data reflecting an imaging target, such as a video camera, a high-speed camera, an infrared camera, or the like. In addition, in a case where the high-speed camera is used as the imaging device 10, it is possible to shorten a time interval between images that can be acquired, and thus measurement is facilitated in a case where the flow rate is high. Further, in a case where an infrared camera is used as the imaging device 10, even when the granular object 3 cannot be captured visually due to dust or the like, it is possible to capture, for example, a high-temperature granular object 3 such as granular molten iron by sensing the heat of the granular object 3. In FIGS. 1 and 2, only one imaging device 10 is illustrated, but a plurality of imaging devices may be installed.

The computer 11 is connected to the imaging device 10 by wire or wireless, and includes a processing unit 110 that performs processing based on data from the imaging device 10, a storage device 111 that stores time-series image data from the imaging device, and a central computing device 112 that performs processing of the processing unit 110.

The input device 12 is configured with a device such as a keyboard, mouse, or the like that inputs an instruction to the processing unit 110.

The output device 13 is a monitor that displays the processing result in the processing unit 110.

The processing unit 110 includes an analysis unit 113 that processes the time-series image data from the imaging device 10, a vibration measuring unit 114 that measures the vibration frequency (for example, the angular frequency) of the target location from the calculation result calculated by the analysis unit 113, and a grain size estimation unit 115 that estimates the grain size of the granular object 3 from the vibration frequency obtained by the vibration measuring unit 114 and the mass flow rate of the granular object 3.

<Method for Measuring Granular Objects>

Figure 3:
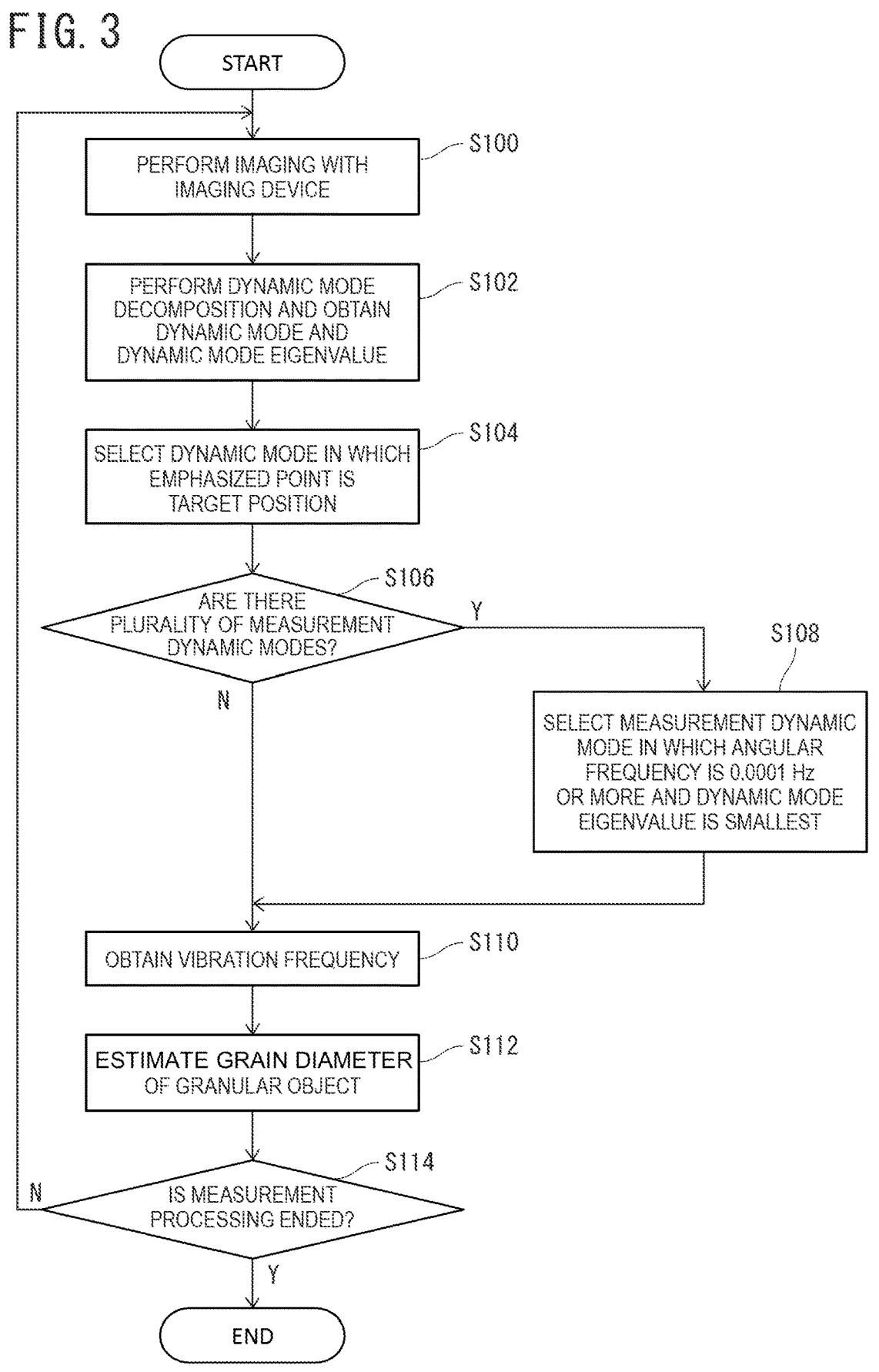
FIG. 3 is a flowchart illustrating the method for measuring granular objects according to one embodiment of the present invention.

Measuring the granular objects by the apparatus 1 for measuring is performed according to the flowchart illustrated in FIG. 3.

First, the imaging device 10 images a state in which the granular object 3 lands on the first liquid 2 (imaging step, S100). In step S100, the imaging device 10 captures an image including at least the liquid surface (bath surface) of the first liquid 2. It is preferable that the imaging device 10 captures an image including the landing surface of the granular object 3 on the liquid surface of the first liquid 2, and the imaging device 10 may capture an image including the granular object 3 in addition to the liquid surface of the first liquid 2. The image is time-series image data on a time series, and is transferred to the computer 11 connected to the imaging device 10. The time-series image data transferred to the computer 11 is stored in the storage device 111 when instructed by the input device 12 or by other processing of the computer 11.

The time-series image data is an image obtained by arranging two-dimensional image data Pt in a time direction and is represented by a two-dimensional matrix illustrated in the following Formula (1).

[Math. 3]

$$P_t = \begin{bmatrix} a_{11}^t & \cdots & a_{1n}^t \\ \vdots & \ddots & \vdots \\ a_{m1}^t & \cdots & a_{mn}^t \end{bmatrix} \qquad \text{Formula (1)}$$

In Formula (1), a represents a pixel value of image data, a subscript under a represents an element number in a vertical direction and a horizontal direction of matrix spaces, and a superscript over a represents a time. The time-series image data is a three-dimensional matrix obtained by arranging the two-dimensional matrix of Formula (1) in the time direction.

In the analysis unit 113, the image data Pt that is a two-dimensional matrix of the three-dimensional time-series image data is aligned in one column according to the conversion rule to obtain one-dimensional image data, and is converted into a data matrix of Formula (2) having a spatial direction and a time direction. As the conversion rule in this conversion, for example, a method of arranging $a_{11}$, $a_{12}$, . . . , $a_{1n}$ in a column direction priority, then arranging $a_{21}$, $a_{22}$, . . . , $a_{2n}$, and repeating this operation up to the end portion in a row direction may be used. Any conversion rule may be used as long as the same conversion rule is applied to all time-series image data. For convenience, the number of rows of the image data is denoted by m, and the number of columns is denoted by n. The image data at a certain time t in the time direction of the data matrix is referred to as a snapshot, and the number of snapshots is denoted by tt.

[Math. 4]

$$X = \begin{bmatrix} a_{11}^1 & \cdots & a_{1n}^{tt} \\ \vdots & \ddots & \vdots \\ a_{mn}^1 & \cdots & a_{mn}^{tt} \end{bmatrix} \qquad \text{Formula (2)}$$

In Formula (4), the matrix has the spatial direction in the row direction and the time direction in the column direction, but even if the matrix is reversed, it becomes the same as Formula (4) by taking the transposed matrix, and thus the generality is not lost.

After step S100, the analysis unit 113 performs dynamic mode decomposition on the data matrix and calculates the dynamic mode and the dynamic mode eigenvalue corresponding to the dynamic mode (S102). As the dynamic mode decomposition, for example, methods disclosed in Literature 1 (P. J. Schmid, "Dynamic mode decomposition of numerical and experimental data", Journal of Fluid Mechanics, 2010.) or Literature 2 (Tu, Rowley, Luchtenburg, Brunton, and Kutz, "On Dynamic Mode Decomposition: Theory and Applications", American Institute of Mathematical Sciences, 2014.) can be used.

The dynamic mode decomposition is a method of decomposing features of the data matrix by constructing a relational formula of Formula (5) using two divided data matrices $Y_1$ and $Y_2$ obtained by shifting the data matrix illustrated in Formula (3) and Formula (4) in the time direction and by obtaining the eigenvector and the eigenvalue of A or $A_{tilde}$ subjected to the similarity transformation of A in Formula (5). The eigenvector and the eigenvalue of A or $A_{tilde}$ are a dynamic mode and a dynamic mode eigenvalue, respectively.

[Math. 5]

$$Y_1 = \begin{bmatrix} a_{11}^1 & \cdots & a_{11}^{n-1} \\ \vdots & \ddots & \vdots \\ a_{mn}^1 & \cdots & a_{mn}^{n-1} \end{bmatrix} \qquad \text{Formula (3)}$$

$$Y_2 = \begin{bmatrix} a_{11}^2 & \cdots & a_{11}^{tt} \\ \vdots & \ddots & \vdots \\ a_{mn}^2 & \cdots & a_{mn}^{tt} \end{bmatrix} \qquad \text{Formula (4)}$$

$$Y_2 = AY_1 \qquad \text{Formula (5)}$$

Several methods for obtaining the dynamic mode and the dynamic mode eigenvalue have been proposed. As an example, a method of the above-described Literature 2 will be described. First, as in Formula (6), $Y_1$ is subjected to singular value decomposition to obtain a right singular vector U, a singular value S, and a left singular vector V. $V^+$ represents an adjoint matrix of V. In a case where all the dynamic modes and the dynamic mode eigenvalues are not required, r singular values may be selected from the largest singular values, and the calculation may be performed using the right singular vector and the left singular vector corresponding to the selected singular values.

[Math. 6]

$$Y_1 = USV^* \qquad \text{Formula (6)}$$

Next, using the right singular vector U, the singular value S, and the left singular vector V, $A_{tilde}$ subjected to the similarity transformation of A is calculated using Formula (7).

[Math. 7]

$$A_{tilde} = U^*AU \qquad \text{Formula (7)}$$

Further, using Formula (5), Formula (6), and Formula (7), the Formula for $A_{tilde}$ is transformed using Formula (8). $S^{-1}$ in Formula (8) is the inverse matrix of S.

[Math. 8]

$$A_{tilde} = U^*Y_2VS^{-1} \qquad \text{Formula (8)}$$

Thereafter, the eigenvalue decomposition is performed for $A_{tilde}$, an eigenvalue $\mu$ and an eigenvector W are obtained. $A_{tilde}$, the eigenvalue $\mu$, and the eigenvector W have a relationship of Formula (9). In general, A and the eigenvalue of $A_{tilde}$ subjected to the similarity transformation match. Therefore, the eigenvalue $\mu$ is the dynamic mode eigenvalue.

[Math. 9]

$$A_{tilde}W = W\mu \qquad \text{Formula (9)}$$

Next, using Formula (10), the eigenvector of A, that is, a dynamic mode $\Phi$ is obtained from the eigenvector W of $A_{tilde}$. In this manner, the dynamic mode $\Phi$ and the dynamic mode eigenvalue $\mu$ can be obtained. The dynamic mode $\Phi$ and the dynamic mode eigenvalue $\mu$ are complex numbers. The dynamic mode $\Phi$ obtained by dynamic mode decomposition represents the features of the spatial direction of the data matrix.

[Math. 10]

$$\Phi = Y_2VS^{-1}W \qquad \text{Formula (10)}$$

Further, $\Omega$ can be obtained by performing the transformation of Formula (13) for the dynamic mode eigenvalue $\mu$ corresponding to the dynamic mode $\Phi$. In Formula (11), dt[s] represents a time step between snapshots of the data matrix.

[Math. 11]

$$\Omega = \frac{\log(\mu)}{dt} \qquad \text{Formula (11)}$$

Here, when the restoration one-dimensional image data at the time of the snapshot n is denoted by $X_n$ and the one-dimensional image data at the time of the initial snapshot is denoted by $X_0$, the relational formula of Formula (12) is established. Since the dynamic mode eigenvalue $\mu$ is a complex number, $\Omega$ is also a complex number. When $\Omega$ is decomposed into a real part a and an imaginary part b as in Formula (13), $\Omega$ is a multiplier of the Napier number, and from Euler's Formula, it can be seen that the real part a of $\Omega$ represents amplification and attenuation, and the imaginary part b represents the angular frequency. Further, the angular frequency b [rad/s] can be converted into the frequency f [Hz] in Formula (14).

[Math. 12]

$$X_n = \Phi e^{\Omega n}\Phi^{-1}X_0 \qquad \text{Formula (12)}$$

$$\Omega = a + ib \qquad \text{Formula (13)}$$

$$f = \frac{b}{2\pi} \qquad \text{Formula (14)}$$

In the present embodiment, the dynamic mode decomposition is a method of decomposing a plurality of spatial features and time directions corresponding to the spatial features into frequencies, for example, by the above-described operation. Therefore, even if the time-series image data includes a phenomenon including a plurality of frequencies, the dynamic modes represent dynamic mode eigenvalues having respective frequencies and feature points in space corresponding to the eigenvalues and operating at the frequencies.

In the captured image, not only the granular object 3 to be measured but also other moving objects may be captured. When the dynamic mode decomposition is used, a position of the phenomenon of the vibration frequency to be examined appears as an emphasized point of the dynamic mode, so that the vibration frequency to be examined can be determined.

After step S102, the vibration measuring unit 114 selects a dynamic mode in which the emphasized point of the dynamic mode is the target position, from the dynamic modes calculated by the dynamic mode decomposition, and obtains the dynamic mode eigenvalue of the selected dynamic mode (S104). The target position is, for example, a position of the liquid surface (vibrating liquid surface) that vibrates when the granular objects 3 are thrown. In addition, in step S104, in addition to the vibrating liquid surface, a dynamic mode in which the emphasized point of the dynamic mode calculated by the dynamic mode decomposition is a position of the granular object 3 may be selected, and the corresponding dynamic mode eigenvalue may be obtained. The emphasized point of the dynamic mode is also referred to as a vibration position, and the dynamic mode selected in step S104 is also referred to as a measurement dynamic mode. The time-series image data also includes things other than the granular objects 3 and the vibrating liquid surface that vibrates because of the granular objects 3. According to step S104, the data of the granular object 3 or the vibrating liquid surface that vibrates because of the granular object 3 is extracted, and thus the measurement accuracy can be improved.

After step S104, the vibration measuring unit 114 determines whether or not there are a plurality of measurement dynamic modes (S106).

In step S106, in a case where it is determined that there are a plurality of the measurement dynamic modes, the vibration measuring unit 114 selects a measurement dynamic mode of the dynamic mode eigenvalue having the smallest absolute value of the vibration frequency, in which the absolute value of the vibration frequency of the dynamic mode eigenvalue is 0.0001 Hz or more (S108). As the vibration frequency, for example, an angular frequency b [rad/s] calculated by the dynamic mode decomposition according to the above-described Literature 2 can be used. In a case where there are a plurality of measurement dynamic modes selected in step S104, the dynamic mode eigenvalue that is an integer multiple of the frequency obtained from the dynamic mode eigenvalue may be selected. In addition, one whose frequency is 0 may have a background or the like having no motion in the time-series image data.

The dynamic mode eigenvalues include dynamic mode eigenvalues that are given for a complex conjugate relationship and dynamic mode eigenvalues in which the complex part has a negative value. However, in a case where it is known that a thing that is not at the target location and whose vibration frequency is small is included in the time-series image data, the vibration frequencies of things that are not at the target location may be measured and removed from the candidates.

In addition, in step S108, instead of the vibration frequency, the dynamic mode eigenvalue may be selected using the frequency obtained from the vibration frequency. As the frequency, for example, a frequency f [Hz] calculated by the dynamic mode decomposition according to the above-described Literature 2 can be used. In this case, considering that a numerical error on calculation by the computer is included, it is preferable to select, as the measurement vibration frequency, the dynamic mode eigenvalue having an absolute value of the frequency of 0.01 Hz or more corresponding to the dynamic mode indicating the emphasized point of the target location and having the smallest absolute value of the frequency. However, in a case where it is known that things that are not at the target location and whose absolute value of the frequency is small are included in the time-series image data, frequencies of things that are not at the target location are measured and removed from the candidates.

In step S106, in a case where it is determined that there are no plurality of measurement dynamic modes, or after step S108, the vibration measuring unit 114 obtains the number of vibration frequencies from the dynamic mode eigenvalues of the selected measurement dynamic mode (S110). As the vibration frequency, for example, an angular frequency r [rad/s] calculated by the dynamic mode decomposition according to the above-described Literature 2 can be used. In addition, in step S114, a frequency may be obtained instead of the vibration frequency. The vibration frequency or the frequency obtained in step S110 is also referred to as a measurement vibration frequency or a measurement frequency.

After step S110, the grain size estimation unit 115 estimates the grain diameter of the granular object 3 using the measurement vibration frequency (or the measurement frequency) obtained in step S110 (S112). In a case where the mass flow rate of the granular object 3 and the mass of the granular object 3 are known, when the mass flow rate of the granular object 3 is denoted by G [kg/s], the density is denoted by $\rho$ [kg/m$^3$], the number of particles per unit time is denoted by q, the granular object is assumed to be a sphere, and the representative grain diameter is denoted by D, the representative grain diameter D [m] can be represented by Formula (15).

[Math. 13]

$$D = \left(\frac{6G}{\pi q \rho}\right)^{\frac{1}{3}}$$ Formula (15)

The number of particles per unit time vibrates the liquid surface, and thus the number of particles and the frequency of the vibration caused by the number of particles correspond to each other. Therefore, when the frequency obtained by the vibration measuring unit 114 is denoted by f[Hz], it can be considered that "q≈f", and the formula for inferring the grain diameter of the granular object 3 from the vibration frequency obtained by the vibration measuring unit 114 is Formula (16).

[Math. 14]

$$D = \left(\frac{6G}{\pi f \rho}\right)^{\frac{1}{3}}$$ Formula (16)

In addition, in the case of actual operation, the granular object 3 often has a complex shape rather than a true sphere. Further, depending on the frame rate and the imaging performance of the imaging device 10 to be used for imaging, there is a possibility that a deviation may occur in the frequency obtained by the vibration measuring unit 114 with respect to the true frequency.

Therefore, in Formula (16), the Formula (16) is modified to Formula (17) by correcting an error in assuming that the granular object with a complex shape is a sphere, a deviation due to the imaging device, a constant, and a density of the granular object, which is less likely to change as long as the apparatus is the same, as a correction coefficient C. In Formula (17), a value of the correction coefficient C may be set (corrected) by performing an experiment before the operation of the processing apparatus (for example, the production apparatus that produces the granular iron in FIG. 1) is actually started. By using the formula (17) including the correction coefficient c, it is possible to use it for various apparatuses and the granular objects 3, and it is possible to improve the use flexibility of the apparatus 1 for measuring.

[Math. 15]

$$D = C \left( \frac{G}{f} \right)^{\frac{1}{3}}$$

Formula (17)

Further, in a case where the granular object 3 has a shape significantly different from a true sphere, the exponent may deviate from ⅓ in Formula (16) and Formula (17). In this case, Formula (18) having the correction exponent k may be used. In Formula (18), a value of the correction coefficient C and the correction exponent k may be set (corrected) by performing an experiment before the actual operation of the processing apparatus is started, in the same manner as in Formula (17). By using Formula (18), the granular object 3 can be used even when the granular object 3 has a shape significantly different from a true sphere.

[Math. 16]

$$D = C \left( \frac{G}{f} \right)^{k}$$

Formula (18)

In step S112, a grain diameter estimation unit can estimate the grain diameter using Formula (16), Formula (17), or Formula (18). The estimation result of the grain diameter may be displayed on the output device 13 as a measurement result.

After step S112, the processing unit 110 determines whether or not to end the measurement processing of the grain diameter (S114). The end of the measurement processing is determined according to the elapsed time from the start of the processing, a command for ending the processing input from the input device, or the like. In a case where it is determined in step S114 that the measurement processing is not ended, the processing after step S100 is repeated. On the other hand, in a case where it is determined that the measurement processing is ended, the measurement processing is ended. The processing of steps S102 to S114 is also referred to as a measuring step.

According to the apparatus 1 and the method for measuring granular objects 3 according to the present embodiment, in the measurement of the phenomenon of vibrating the liquid surface of the first liquid 2, the liquid surface is continuously imaged, dynamic mode decomposition is performed on time-series image data obtained by imaging, and the grain diameter of the granular object 3 and the like are measured. In addition, in the dynamic mode decomposition, the dynamic mode in which the emphasized point is the vibrating liquid surface is selected among the obtained dynamic modes as the measurement dynamic mode, the measurement vibration frequency, which is the vibration frequency of the dynamic mode eigenvalue in the measurement dynamic mode, is obtained, and the granular object is measured based on the measurement vibration frequency.

In the process of producing granular iron as in the present embodiment, a large number of granular molten iron is present, and it is difficult to measure each of the granular molten iron. In addition, when the granular molten iron lands on water, water is scattered due to the kinetic energy of the granular molten iron, so that many water droplets are present. However, according to the apparatus 1 and the method for measuring granular objects 3 according to the present embodiment, since dynamic mode decomposition is used as a method, it is possible to measure a large number of granular objects 3 from the vibration of the liquid surface. In addition, even when many water droplets are present, the grain diameter of the granular object 3 and the like can be measured with high accuracy from the vibration of the liquid surface.

<Method for Producing Granular Iron>

Next, a method for producing granular iron in the present embodiment will be described. In the present embodiment, granular iron is produced using the equipment having the apparatus configuration illustrated in FIG. 1. That is, the collision structure 5 made of a refractory material or the like is provided above the first liquid 2, and the second liquid 4, which is molten iron, is thrown from above to collide with the collision structure 5. The molten iron that has collided with the collision structure 5 is granulated to become granular objects 3 (granular molten iron), and is thrown into the first liquid 2. In addition, the granular molten iron thrown into the first liquid 2 is cooled and solidified to produce granular iron. The granular iron to be produced is 1 mm to 30 mm in diameter and has a large surface area, making it an iron source that can be easily melted in an electric furnace or the like.

In addition, in the method for producing granular iron according to the present embodiment, when producing the granular iron, the grain size of the granular molten iron, that is, the granular object 3, is measured using the above-described method for measuring granular objects 3. In the present embodiment, the measurement of the grain size, that is, the processing of the steps S100 to S114 in FIG. 3 is repeatedly performed during the production of the granular iron, so that the measurement of the generated granular molten iron is continuously performed in real time.

In the method for producing granular iron according to the present embodiment, in a case where the granular molten iron that is thrown into water is too large, the granular molten iron is not completely solidified in water, and the granular molten iron is continuously thrown into water. As a result, the granular molten iron may stick together in a state in which water is contained. In this case, the water in the molten iron boils and evaporates at the temperature of the molten iron, and the volume thereof increases by several hundred times. Therefore, in a case where water is contained in the molten iron, the water has no place to go with a volume increased by several hundred times, and the pressure increases, and in some cases, a steam explosion occurs. In addition, in a situation where granular molten iron is dispersed in water when the steam explosion occurs, the surface of the granular molten iron in water may be destabilized and refined by the pressure wave of the explosion, and a further steam explosion may be induced. Therefore, there is a possibility that a very large steam explosion may be caused.

In order to prevent the occurrence of the steam explosion, in a case where a high-temperature melt such as molten iron is used as the second liquid 4, it is necessary to control the size of the granular object 3 to be generated to a certain extent or less. Therefore, by using the method for measuring according to the present embodiment, the liquid surface or the frequency associated with the throwing of the granular molten iron can be specified by dynamic mode decomposition of the time-series image data obtained by imaging the region where the granular molten iron is thrown into the water, and the grain diameter of the granular molten iron can be estimated. In addition, the grain diameter of the granular molten iron can be controlled by adjusting the producing conditions, for example, the throwing speed of the second liquid 4, according to the measured grain diameter.

In addition, in the present embodiment, in addition to the above-described method for measuring, the abnormality may be notified in a case where the grain diameter is equal to or more than the threshold value from the measurement result of the grain diameter of the granular molten iron. In this case, the abnormality notification method including the measurement processing of the grain diameter of the granular molten iron is performed according to a processing flow illustrated in FIG. 4. Among the processing illustrated in FIG. 4, the processing of the steps S100 to S114 is the same as the processing illustrated in FIG. 3.

Figure 4:
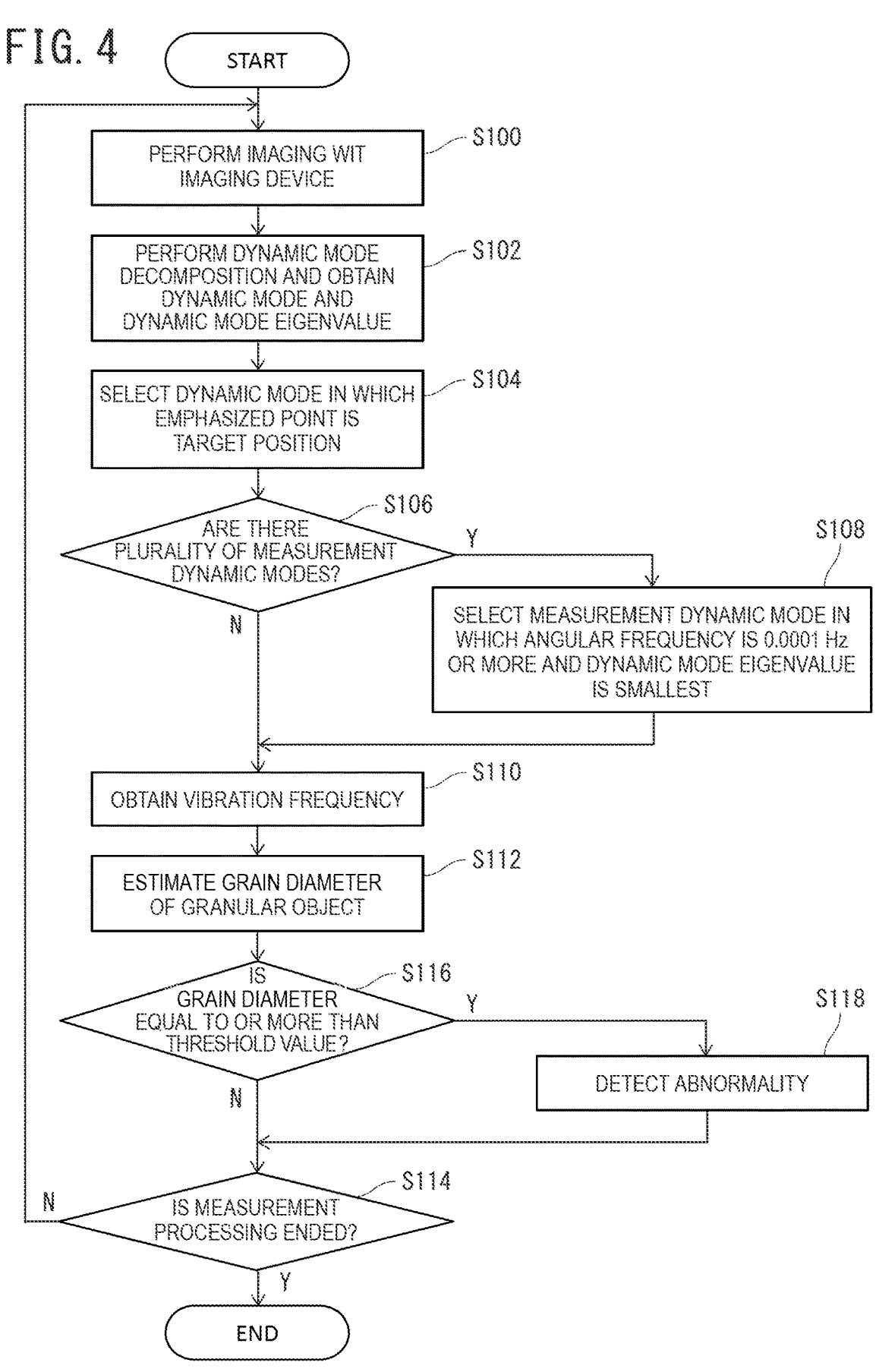
FIG. 4 is a flowchart illustrating an abnormality detection method.

In the processing illustrated in FIG. 4, after the grain size of the granular object 3 is estimated in step S112, the processing unit 110 determines whether or not the estimated grain size is equal to or more than the threshold value (S116). The threshold value is, for example, a grain diameter at which steam explosion is likely to occur, and may be obtained in advance by an experiment because the threshold value varies depending on the shape of the production apparatus, the physical properties of the granular molten iron, or the like.

In a case where it is determined in step S116 that the grain size is equal to or more than the threshold value, the processing unit 110 notifies that an abnormality has occurred via the output device 13 or the like (S118). By issuing the abnormality notification as described above, it is possible to detect the abnormality before the steam explosion occurs, and the safety can be ensured. In a case where the abnormality is notified, the abnormality may be displayed on an output terminal and a person may confirm the abnormality, and a measure may be taken in which a person copes with the abnormality according to the situation at that time, or the abnormality notification may be incorporated into the system and a measure may be taken in which the producing capacity of the production apparatus is reduced or stopped or the like when the abnormality notification is made. The steps of step S116 and step S118 are also referred to as an abnormality detection step.

In a case where it is determined in step S116 that the grain size is less than the threshold value, or after step S118, the processing of step S114 is performed. That is, in a case where it is determined in step S116 that the grain size is less than the threshold value, the processing unit 110 determines that no abnormality has occurred, and the production of granular iron is continued. In addition, after step S118, processing for controlling the grain diameter may be performed as described above. By doing so, it is possible to automatically detect the abnormality.

MODIFICATION EXAMPLE

Although aspects of the present invention have been described with reference to specific embodiments, the present invention is not intended to be limited by these descriptions. By referring to the description of embodiments of the present invention, it is also apparent to those skilled in the art that there are other embodiments of the present invention including various modifications with the disclosed embodiments. Therefore, it should be understood that the embodiments of the invention described in the claims also include embodiments including these modification examples alone or in combination, which are described in the present specification.

For example, in the above-described embodiment, the second liquid 4 is caused to collide with the collision structure 5 to be granulated, but the present invention is not limited to such an example. Other mechanisms or methods may be used as long as the second liquid 4 can be granulated.

In addition, in the above embodiment, the granular object 3 is the granular molten iron obtained by granulating the molten iron which is the second liquid 4, but the present invention is not limited to such an example. For example, the granular object 3 may be a large number of granular solids instead of the granular second liquid 4. In addition, the granular object is not limited to iron and may be another substance.

Further, in the above-described embodiment, the apparatus 1 for measuring measures the grain diameter of the granular object 3, but the present invention is not limited to such an example. The apparatus 1 for measuring may measure other physical quantities such as the number of the granular objects 3 as long as the apparatus 1 for measuring can measure the other physical quantities according to the vibration frequency of the granular objects 3 or the frequency. For example, in a case where the apparatus 1 for measuring measures the number of granular objects 3, it is also possible to ascertain the average grain diameter of the granular objects 3 by using the known mass flow rate of the granular object 3 from the measured number.

REFERENCE SIGNS LIST

1 apparatus for measuring
10 imaging device
11 computer
110 processing unit
111 storage device
112 central computing device
113 analysis unit
114 vibration measuring unit
115 grain size estimation unit
12 input device
13 output device
2 first liquid
3 granular object
4 second liquid
5 collision structure

The invention claimed is:

1. An apparatus for measuring granular objects that measures granular objects thrown into a liquid surface of a first liquid, the apparatus comprising:

an imaging device configured to continuously image the liquid surface; and a processing unit configured to measure the granular objects from time-series image data of the liquid surface imaged by the imaging device, wherein the processing unit is configured to perform dynamic mode decomposition on the time-series image data, select, as a measurement dynamic mode, a dynamic mode in which an emphasized point is a vibrating liquid surface among dynamic modes obtained by the dynamic mode decomposition, obtain a measurement vibration frequency as a vibration frequency of a dynamic mode eigenvalue in the measurement dynamic mode, and measure the granular objects based on the measurement vibration frequency.

2. The apparatus for measuring granular objects according to claim 1, wherein the processing unit is configured to select, in a case where there are a plurality of the measurement dynamic modes, a measurement dynamic mode in which an absolute value of the vibration frequency of the dynamic mode eigenvalue is 0.0001 Hz or more and the absolute value of the vibration frequency is small.

3. The apparatus for measuring granular objects according to claim 1, wherein the processing unit is configured to measure the number of the granular objects based on the measurement vibration frequency.

4. The apparatus for measuring granular objects according to claim 1, wherein the processing unit is configured to measure a grain diameter of the granular object based on the measurement vibration frequency.

5. The apparatus for measuring granular objects according to claim 4, wherein the processing unit is configured to measure the grain diameter using Formula (16),

[Math. 1]

$$D = \left( \frac{6G}{\pi f \rho} \right)^{\frac{1}{3}} \qquad \text{Formula (16)}$$

D: representative grain diameter [m],
G: mass flow rate of granular object [kg/s],
f: measurement vibration frequency [Hz], and
ρ: density of granular object [kg/m³].

6. The apparatus for measuring granular objects according to claim 4, wherein the processing unit is configured to measure the grain diameter using Formula (18),

[Math. 2]

$$D = C \left( \frac{G}{f} \right)^{k} \qquad \text{Formula (18)}$$

D: representative grain diameter [m],
C: correction coefficient,
G: mass flow rate of granular object [kg/s],
f: measurement vibration frequency [Hz], and
k: correction exponent.

7. The apparatus for measuring granular objects according to claim 1, wherein the granular object is generated by colliding a second liquid with a collision structure.

8. The apparatus for measuring granular objects according to claim 7, wherein the first liquid is water containing $H_2O$ as a main component, and the second liquid is molten iron containing Fe as a main component.

9. A method for measuring granular objects that measures granular objects thrown into a liquid surface of a first liquid, the method comprising:

an imaging step of continuously imaging the liquid surface; and a measuring step of measuring the granular objects from time-series image data of the liquid surface obtained by imaging, wherein the measuring step includes, performing dynamic mode decomposition on the time-series image data, selecting, as a measurement dynamic mode, a dynamic mode in which an emphasized point is a vibrating liquid surface among dynamic modes obtained by the dynamic mode decomposition, obtaining a measurement vibration frequency as a vibration frequency of a dynamic mode eigenvalue in the measurement dynamic mode, and measuring the granular objects based on the measurement vibration frequency.

10. The method for measuring granular objects according to claim 9, wherein the measuring step includes, measuring a grain diameter of the granular object based on the measurement vibration frequency.

11. An abnormality detection method for detecting an abnormality in granular objects thrown into a liquid surface of a first liquid, the method comprising:

determining whether or not the grain diameter is equal to or more than a threshold value after measuring a grain diameter of the granular object by using the method for measuring granular objects according to claim 10; and detecting that the abnormality has occurred in a case where the grain diameter is equal to or more than the threshold value.

12. A method for producing granular iron, comprising:

generating granular objects which are granular molten iron by colliding a second liquid, which is molten iron containing Fe as a main component, with a collision structure; and producing granular iron by throwing the generated granular objects into a first liquid, which is water containing $H_2O$ as a main component, wherein, when the granular objects are thrown into the first liquid, the granular objects thrown into a liquid surface of the first liquid are measured by using the method for measuring granular objects according to claim 9.

13. The apparatus for measuring granular objects according to claim 2, wherein the processing unit is configured to measure the number of the granular objects based on the measurement vibration frequency.

14. The apparatus for measuring granular objects according to claim 2, wherein the processing unit is configured to measure a grain diameter of the granular object based on the measurement vibration frequency.

15. The apparatus for measuring granular objects according to claim 14, wherein the processing unit is configured to measure the grain diameter using Formula (16),

[Math. 1]

$$D = \left( \frac{6G}{\pi f \rho} \right)^{\frac{1}{3}} \qquad \text{Formula (16)}$$

D: representative grain diameter [m],
G: mass flow rate of granular object [kg/s],
f: measurement vibration frequency [Hz], and
ρ: density of granular object [kg/m³].

16. The apparatus for measuring granular objects according to claim 14, wherein the processing unit is configured to measure the grain diameter using Formula (18),

[Math. 2]

$$D = C\left(\frac{G}{f}\right)^{k} \qquad \text{Formula (18)}$$

D: representative grain diameter [m],
    C: correction coefficient,
    G: mass flow rate of granular object [kg/s],
    f: measurement vibration frequency [Hz], and
    k: correction exponent.

17. The apparatus for measuring granular objects according to claim 2, wherein the granular object is generated by colliding a second liquid with a collision structure.

18. The apparatus for measuring granular objects according to claim 3, wherein the granular object is generated by colliding a second liquid with a collision structure.

19. The apparatus for measuring granular objects according to claim 4, wherein the granular object is generated by colliding a second liquid with a collision structure.

20. The apparatus for measuring granular objects according to claim 5, wherein the granular object is generated by colliding a second liquid with a collision structure.

\* \* \* \* \*